United States Patent
Kumar et al.

(10) Patent No.: US 9,607,309 B2
(45) Date of Patent: Mar. 28, 2017

(54) METHODS AND SYSTEMS FOR FACILITATING COMMUNICATIONS BETWEEN PROVIDERS OF ON-LINE SERVICES AND POTENTIAL CUSTOMERS

(71) Applicant: Yahoo! Inc., Sunnyvale, CA (US)

(72) Inventors: Amit Kumar, San Jose, CA (US); Rajat Mukherjee, San Jose, CA (US); Andrew Pariser, Palo Alto, CA (US); Kevin Patrick Thill, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 545 days.

(21) Appl. No.: 14/196,389

(22) Filed: Mar. 4, 2014

(65) Prior Publication Data
US 2014/0297362 A1    Oct. 2, 2014

Related U.S. Application Data

(60) Provisional application No. 61/772,389, filed on Mar. 4, 2013.

(51) Int. Cl.
*G06Q 30/02* (2012.01)
*G06Q 99/00* (2006.01)

(52) U.S. Cl.
CPC ..... *G06Q 30/0201* (2013.01); *G06Q 30/0253* (2013.01); *G06Q 99/00* (2013.01)

(58) Field of Classification Search
None
See application file for complete search history.

(56) References Cited

U.S. PATENT DOCUMENTS

| | | | | |
|---|---|---|---|---|
| 7,197,537 | B2* | 3/2007 | Koch | G06F 17/30091 707/999.202 |
| 8,214,890 | B2* | 7/2012 | Kirovski | H04L 9/3073 726/12 |
| 8,355,934 | B2* | 1/2013 | Virdhagriswaran | G06Q 10/067 705/35 |
| 8,386,340 | B1* | 2/2013 | Feinstein | G06Q 30/02 705/27.1 |
| 8,401,171 | B1* | 3/2013 | Nunez, III | H04M 3/51 379/265.09 |

(Continued)

OTHER PUBLICATIONS

Chiranky, L., "Web Power: Taking Call Centers to New Dimensions," Telemarketing and and Call CenterSolutions, vol. 15, No. 7, p. 96, Jan. 1997.*

(Continued)

*Primary Examiner* — Nicholas D Rosen
(74) *Attorney, Agent, or Firm* — Mauriel Kapouytian Woods LLP; Serge Krimnus; James Woods

(57) ABSTRACT

Systems and methods are provided that can include monitoring of activities of potential customer users, for example, on an e-commerce Web site. Based at least in part on the monitored activities, a notification or alert may be provided to a merchant or a merchant administrator, regarding a potential customer, such as by being sent to a mobile device of the merchant or merchant administrator. Real-time communications may be facilitated or initiated between the merchant or the merchant administrator and the potential customer, such as with regard to a potential purchase, which communications can include the use of mobile devices.

20 Claims, 8 Drawing Sheets

(56) References Cited

U.S. PATENT DOCUMENTS

| | | | |
|---|---|---|---|
| 8,572,264 B2* | 10/2013 | Dutta | G06F 9/06 709/219 |
| 2002/0087385 A1* | 7/2002 | Vincent | G06Q 10/10 705/7.29 |
| 2003/0046389 A1* | 3/2003 | Thieme | G06F 17/30864 709/224 |
| 2003/0187955 A1* | 10/2003 | Koch | G06F 17/30091 709/219 |
| 2004/0093327 A1* | 5/2004 | Anderson | G06Q 30/02 |
| 2008/0109286 A1* | 5/2008 | Johnson | G06Q 10/06 705/16 |
| 2009/0172565 A1* | 7/2009 | Jackson | H04L 67/1095 715/753 |
| 2010/0058064 A1* | 3/2010 | Kirovski | H04L 9/3073 713/176 |
| 2011/0087512 A1* | 4/2011 | Kaundinya | G06Q 10/06 705/7.15 |
| 2011/0184766 A1* | 7/2011 | Virdhagriswaran | G06Q 10/067 705/4 |
| 2011/0246258 A1* | 10/2011 | Cragun | G06Q 30/02 705/7.31 |
| 2012/0296682 A1* | 11/2012 | Kumar | G06Q 10/00 705/7.11 |
| 2012/0296697 A1* | 11/2012 | Kumar | G06Q 30/08 705/7.29 |
| 2013/0018713 A1* | 1/2013 | Kumar | G06Q 30/0601 705/14.12 |
| 2013/0019026 A1* | 1/2013 | Dutta | G06F 9/06 709/238 |
| 2013/0167044 A1* | 6/2013 | Graves | H04M 3/5191 715/756 |

OTHER PUBLICATIONS

Chiranky, L., "Customer Advocacy Paradigm: The Bonnie Bitton and Beyond," Telemarketing and and Call CenterSolutions, vol. 15, No. 7, p. 98, Jan. 1997.*

* cited by examiner

METHODS AND SYSTEMS FOR FACILITATING COMMUNICATIONS BETWEEN PROVIDERS OF ON-LINE SERVICES AND POTENTIAL CUSTOMERS

PRIORITY APPLICATION

This application claims priority to U.S. Provisional Application No. 61/772,389, filed on Mar. 4, 2013, which is hereby incorporated herein by reference in its entirety.

FIELD OF THE INVENTION

The present invention relates generally to the field of online services, such as e-commerce systems and small and medium online service businesses and methods, and in particular, to providing providers of on-line marketplaces (e.g., merchants) alerts about potential buyers that are currently visiting the on-line marketplace and facilitating direct communications between the providers and the potential buyers, including using mobile devices.

BACKGROUND

E-commerce, which generally refers to commercial activities on-line, is an area that is rapidly increasing in popularity as more and more customers purchase consumer items from Web sites rather visit physical stores. There are several e-commerce Web sites that are devoted to commercial activities. For example, virtual stores such as Amazon™ have sophisticated Web sites that offer a wide variety of products for sale to consumers. Other Web sites provide more limited sets of specialty items and still others cater to business customers as opposed to general consumers. Some Web-based stores have physical world counterparts, but many do not. Irrespective of whether the Web-based stores sell to consumers or business or whether they are extensions of physical world stores or not, or whether they are small businesses offering services to local communities, virtually all Web-based store owners have an interest in understanding who is visiting their Web site and what activities those visitors are engaged in during such visits.

This need for information regarding Web site visitors has spawned the industry of Web analytics. Broadly speaking, Web analytics may be regarded as the measurement, collection, analysis and reporting of data for purposes of understanding Web site usage and visitor behavior. Such analytics are also used in connection with business and market research. Many providers, such as Google™ and others, offer this kind of analytical information to their subscribers in connection with their web sites In particular, on-site Web analytics provide a Web site owner/operator with information regarding actual Web site visitor activities, but usually this is provided in the form of a compilation of historical information over various time periods/visits.

While somewhat useful, historical information provides only an after-the-fact view of visitor behaviors and has limited benefit for the Web site owner/operator. However, unlike real world physical stores, the Web site owner (or merchant) providing goods and services on-line cannot interact with customers in real time, and provide customer support to offer a personalized or customized shopping experience. While some on-line stores may have an on-line customer support chat feature, this requires the consumer to initiate a "call" with the merchant. Many potential buyers will never do so and the result, from the merchant's standpoint, is lost sales.

Also, a merchant of a real world store has the ability to monitor the customers in his store and provide assistance or advice if it appears a customer may leave the premises without making a purchase. Traditional e-commerce merchants do not have this kind of advantage.

Further, most solutions for customer support or customer communications involve a solution on a desktop, requiring support agents to be always at their computers.

Further, solutions also do not differentiate across different visitors, requiring a large set of agents in order to communicate with all/most of the visitors.

Figure 1:
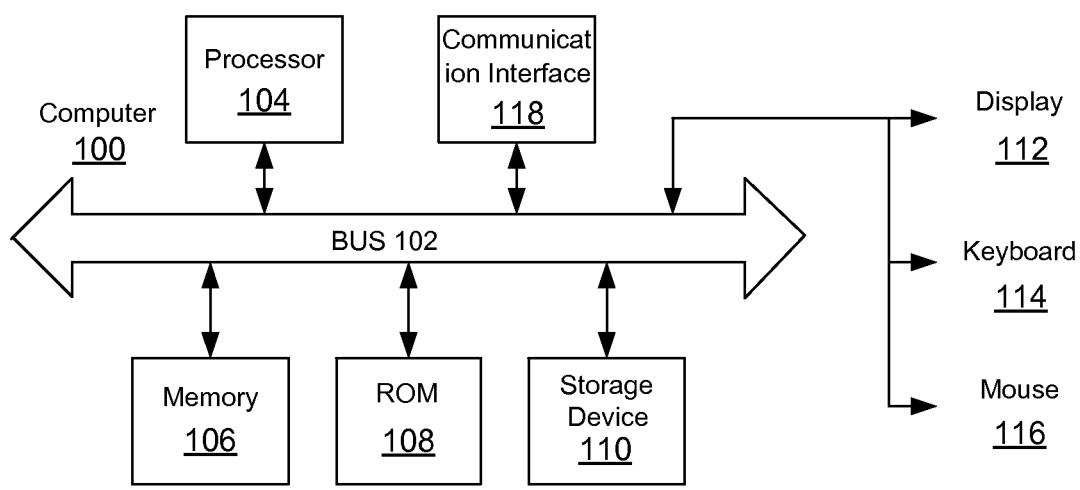
FIG. 1 illustrates a block diagram of a computer system according to one embodiment of the invention.

While the invention is described with reference to the above drawings, the drawings are intended to be illustrative, and the invention contemplates other embodiments within the spirit of the invention.

SUMMARY OF THE INVENTION

Real time and rule based analytics, allowing direct visualization of consumer activity on a Web site (e.g., an e-commerce site) can facilitate increased sales for a merchant by facilitating real-time interactions with customers. Similar to entering a real world physical store, the buying experience can be enhanced by a knowledgeable sales person that can interact at an appropriate time with a customer, make suggestions, recommendations and/or provide discounts or other incentives to a customer to close a sale or intervene in cases where a customer is unable to log on, or may be taking a negative action (such as cancelling service). By providing notifications of triggering on-line customer behaviors directly to a merchant (e.g., via instant message, short message service, email, a phone call, or another communication channel), the merchant is freed from having to continually monitor an analytics station (e.g., a dashboard) in an attempt to observe such customer behaviors and intervene.

It should be appreciated that the invention is not limited to the embodiments described herein. Although the invention will be described with reference to particular embodiments, the description is only an example of the invention's application and should not be taken as a limitation. Various adaptations and combinations of features of the embodiments disclosed are within the scope of the invention. It should also be noted that embodiments of the present invention have been described with references to various software and hardware components, some of which are depicted in the exemplary figures. One of ordinary skill in the art will recognize that modern distributed computing systems allow software and/or hardware components to reside in different locations, servers, clients and/or hardware or firmware components without limiting the location or function of the software, firmware or hardware components as described with reference to the exemplary embodiments and figures.

DETAILED DESCRIPTION

Embodiments of the present invention relate to real-time e-commerce systems and methods for monitoring, interacting and reacting to customer activities on-line.

The present inventors have recognized that historical Web analytic information does not afford Web site owners/operators opportunities for direct and meaningful interaction with visitors to the Web site. For example, reliance on only historical information does not afford the owner/operator a chance to influence a purchase decision of a Web site visitor in real time. Nor does the historical information permit an owner/operator opportunities to provide valued clients of the Web site specialized services, personalized attention or promotions during a current visit to the Web site. Accordingly, the present inventors have recognized a need for providing systems and methods to enable Web site operators to receive notifications when certain triggering customer actions are observed and to initiate direct contact or other interaction with such customers in real time, for example to provide answers to questions, customized promotions, deals, and recommendations in an effort to effect a sale.

In various embodiments of the present invention, owners and/or operators of e-commerce Web sites (also referred to as "merchants") are provided these notifications by an e-commerce analytics system that monitors the activities of customers as those customers are interacting with an on-line storefront. The notifications may be provided by way of instant message, short message service (SMS) message, email, a phone call, or another communications channel. In one embodiment of the invention, the notification is provided to a merchant by way of SMS message, which message includes a hyperlink or other device to allow the merchant to connect directly with the customer in a communication session. For example, the link, when selected, may initiate transmission of a message to the customer (e.g., by way of SMS message, instant message, browser chat window or other communications channel) inviting the customer to engage in a direct conversation with the merchant. This may be by SMS or other chat session or by phone (e.g., where the message to the customer includes the phone number of the merchant and an invitation for the customer to call).

The notification process is facilitated through a real-time analytics system via one or more computer networks. The analytics system can monitor the activities of individual customers and Web browsers that enter an on-line e-commerce Web site and then report the activities of individual customers to the merchant in real-time. The merchant, who is notified by way of SMS message for example, can review the real-time activities of the customers and potentially review a customer profile that provides detailed information concerning the customer's current session activities as well as past visits to and purchase activities at the merchant's Web site and take action accordingly. The analytics system also has the ability to provide the merchant real-time information concerning the prices, supply and demand of various products and services on other e-commerce Web sites, or even physical stores, so the merchant can react in real-time to decide whether to adjust the prices of products and services offered through the merchant's site to meet market demands and/or provide customers visiting his/her on-line store special promotions and deals. In the case of a new customer, the merchant may receive notification of the new customer through the analytics engine, allowing the merchant to greet the customer with a personal message and optionally provide a promotion or deal to the new customer as means of eliciting a purchase.

One embodiment of the invention includes a system for real-time interactions between a merchant and a customer at the merchant's site. The system provides automatic notification to a merchant through an e-commerce Web site connected to an analytics system upon recognizing predefined triggering customer behaviors. Such behaviors may include a visit by the customer to a certain number and/or type of pages at the Web site, to specified pages at the Web site (e.g., pages associated with high margin products), the length of time the customer has been browsing the site, additions to and/or removals of products from an electronic shopping cart, additions of products to a shopping cart but no subsequent purchase within a specified time frame, indications by the customer that he/she intends to cancel a service or unsubscribe from a merchant's newsletter or other service, etc. Further, in some cases the notifications may include information regarding the nature and location of a platform being used by the customer to browse the Web site. For example, the notification may advise the merchant as to whether the customer is browsing using a browser or application associated with a smartphone. Additionally, the notification can include information about the previous history of the visitor, e.g., purchase history, visit history, etc. Alternatively, or in addition, the notification may include location information concerning the customer (e.g., derived from the IP address of the customer's computer system). In either or both instances, the notification may include means for the merchant to initiate a conversation with the customer, for example, a link to initiate an SMS communication session, or to send a message inviting the customer to call the merchant at a specified telephone number. This differs from prior methodologies that required the customer to initiate contact with the merchant or the merchant's customer service center.

Upon receiving a notification from the analytics system, the merchant may initiate contact with the customer by sending an SMS or other message. This is facilitated by the analytics system including within the notification a hyperlink or other means that includes sufficient information for the merchant to initiate a communication channel between the merchant and the customer (e.g., who may be at a remote computer or smartphone). The customer may interact with the merchant through this channel using one or more interfaces, such as chat-boxes or SMS applications on a smartphone or other mobile computing device. In some embodiments, merchant dialog is provided by digitized audio speech to a soundcard on the user's computer or mobile computing device. Other embodiments may include text-to-speech systems whereby the merchant can provide customer support by typing in merchant interfaces. The merchant's written text can be converted by the analytics system using text-to-speech software processing to deliver live auditory speech to a customer on the other end. In the same way the merchant's text can be converted to audio, the customer questions and inquiries via chat boxes or text entries can be converted by the analytics system to synthetic speech audio output to the merchant. It will be appreciated by one of ordinary skill in the art that conventional text-to-speech or speech-to-text software systems can be implemented for use in various embodiments of the present invention.

The present system may include rule-based logic for providing the notifications to the merchant. The rule based system allows the analytics software to provide such notifications based on a number of factors, including time spent by the customer browsing the Web site, the number and type of products put into a customer's shopping cart, the number and types of products removed from a customer's shopping cart, whether the customer has purchased a product/service or has visited the site before, etc. The analytics system is able to gauge customer familiarity with the e-commerce site based on rules and algorithms to determine what level of support to provide the customer and/or whether the customer needs a product specialist. The analytics system also has the advantage of identifying the customer and automatically conveying the identity of the customer to the merchant so that the merchant can greet the customer at personal level and provide customized support to repeat or high volume customers. The analytics system can also identify specific products or services that the customer has purchased/viewed, so that offers, discounts and recommendations can be made that are relevant to the customer.

FIG. 1 illustrates an example of a computer system 100 on which any of the methods and systems of various embodiments of the present invention may be implemented. Computer system 100 may represent any of the computer systems and/or mobile devices discussed in connection with FIGS. 3-5 and, in particular, may represent a server, client, mobile device or other computer system upon which e-commerce servers, Web sites, Web browsers and/or Web analytic applications may be instantiated. Computer system 100 includes a bus 102 or other communication mechanism for communicating information, and a processor 104 coupled with the bus 102 for processing information. Computer system 100 also includes a main memory 106, such as a RAM or other dynamic storage device, coupled to the bus 102 for storing information and instructions (such as instructions for e-commerce rules and promotions) to be executed by processor 104. Main memory 106 also may be used for storing temporary variables or other intermediate information during execution of instructions to be executed by processor 104. Computer system 100 further includes a ROM 108 or other static storage device coupled to the bus 102 for storing static information and instructions for the processor 104. A storage device 110, such as a hard disk, is provided and coupled to the bus 102 for storing information and instructions (such as computer readable instructions comprising the Web analytics engines, customer information, Web server, and user interfaces for the merchant notification application, etc.).

Computer system 100 may be coupled via the bus 102 to a display 112 for displaying information to a user, however, in the case of servers such a display may not be present and all administration of the server may be via remote clients. Likewise, input device 114, including alphanumeric and other keys, may be coupled to the bus 102 for communicating information and command selections to the processor 104, but such a device may not be present in server configurations. In the case of a mobile device, display 112 may be a touch screen display and keyboard 114 may be a virtual keyboard displayed via the touch screen display. Another type of user input device is cursor control device 116, such as a mouse, a trackball, or cursor direction keys for communicating direction information and command selections to processor 104 and for controlling cursor movement on the display 112. Such an input device may or may not be present in a server configuration. In the case of a mobile device, the finger gestures over a touch screen display may replace the need for a mouse or similar cursor control device. Audio to text and text-to-speech systems can be used to eliminate keyboard requirements as well.

Computer system 100 also includes a communication interface 118 coupled to the bus 102. Communication interface 118 provides for two-way, wired and/or wireless data communication to/from computer system 100, for example, via a local area network (LAN) or other network, including the Internet. In the case of a mobile device, the communication interface may be a wireless transceiver configured to facilitate communications over a mobile phone network that conforms to one or more mobile phone telecommunications protocols such as CDMA, CDMA-2000, GSM, GPRS, LTE, etc. Communication interface 118 sends and receives electrical, electromagnetic or optical signals that carry digital data streams representing various types of information and instructions. For example, two or more computer systems 100 may be networked together in a conventional manner with each using a respective communication interface 118.

Figure 3:
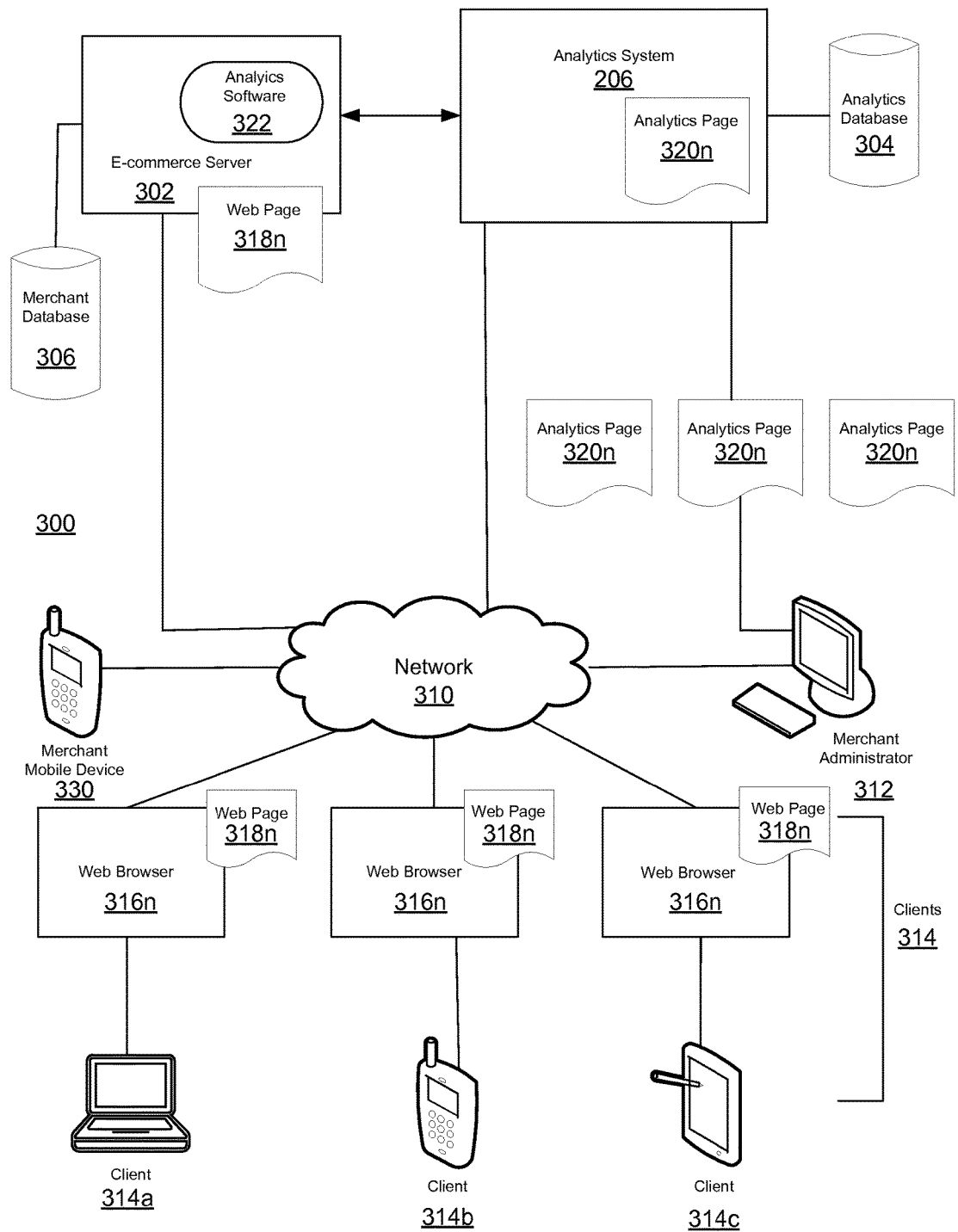
FIG. 3 illustrates a block diagram of a system according to one embodiment of the invention.

It will be appreciated that the merchant administrator 312, clients 314a-314c, and Web site e-commerce server 302, analytics system 208, and database 304 and 308 depicted in FIG. 3, can be implemented in a respective computer system 100.

The various databases described herein are computer-based record keeping systems. Stated differently, these databases are each a combination of computer hardware and software that act together to allow for the storage and retrieval of information (data). Accordingly, they may resemble computer system 100, and are often characterized by having storage mediums capable of accommodating significant amounts of information.

Figure 2:
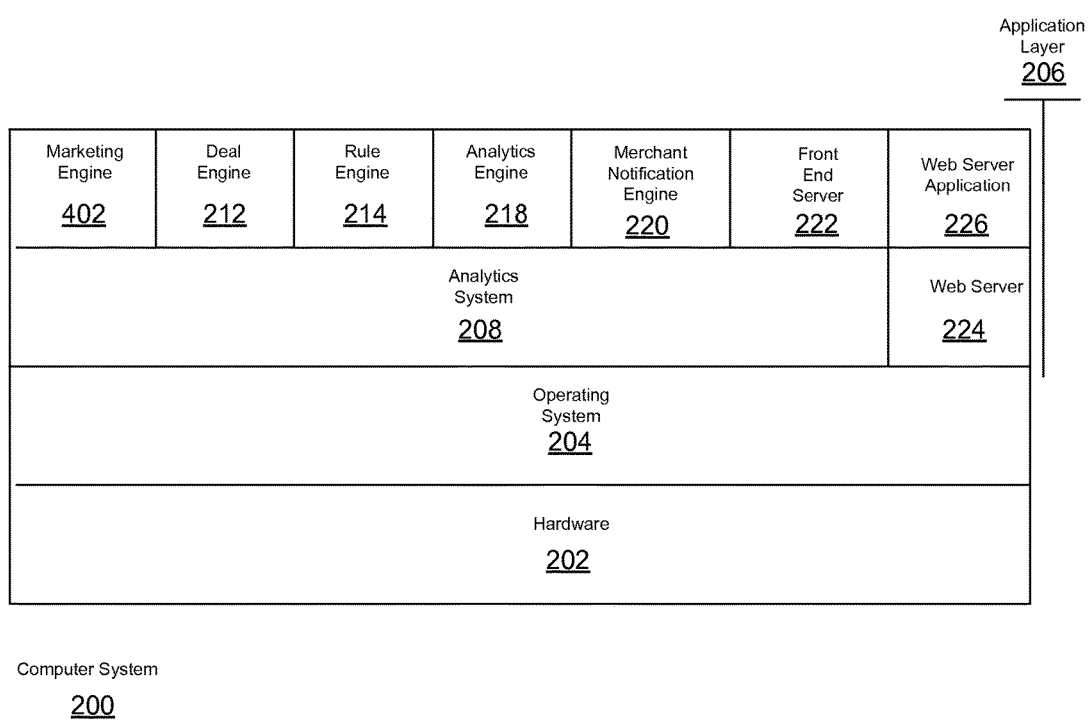
FIG. 2 illustrates a block diagram of a system according to one embodiment of the invention.

FIG. 2 illustrates a computer system 200 from the point of view of its software architecture, according to embodiments of the invention. Computer system 200 may be a server or a group of servers or computers. The various hardware components of computer system 200 are represented as a hardware layer 202. An operating system 204 abstracts the hardware layer and acts as a host for various applications 208-224, which run on computer system 200. In the case of analytics system 208, the operating system acts as a host for an analytics system 208, which communicates with merchant administrators 312 and e-commerce server 302.

The computer system may also include Web server 224. For Web server 224 the operating system may host a Web server application 226, which provides access for the client computers via Web browsers. In the case of a client system, the operating system acts as a host for a Web browser application 316. The e-commerce server 302 and e-commerce Web site 406 may run on Web server 224. In one embodiment the e-commerce server is remote to the analytics system and operates on a different group of computer systems. In another embodiment, the e-commerce system may include the analytics system. One or more Web servers may operate as part of analytics system 208 and Web site e-commerce server 302. The Web server(s) and e-commerce server 302 may be implemented in computer systems similar to computer systems 100 or 200.

The analytics system may require instrumentation on the merchant's web site. When visitors visit the web site, information about the specific user (e.g., web cookies, visit information, product browse information, etc.), are sent to the analytics system for monitoring and triggering purposes.

The analytics system can communicate with the merchant site and with the client site via the network to create a cloud-based solution. Such a solution would apply to different types of web sites that are globally distributed.

The analytics system 208 comprises various software and/or firmware modules, including the deal engine 212, the rule engine 214, the recommendation engine 216, analytics engine 218, merchant notification engine 220 and front-end server 222. It will be appreciated that the analytics system and the various applications/engines 212-226 can reside on a single server, or a group of servers or computers at various locations on a network. The applications/engines 208-222 and 226 are explained in greater detail with reference to FIG. 4 below.

To better understand the context in which real-time analytics and merchant notifications may be employed, consider system 300 illustrated in FIG. 3. Additional details of various components of this system are included in FIGS. 4 and 5.

Included in system 300 are e-commerce servers 302, each hosting one or more e-commerce Web sites. Each Web site may include one or more Web pages 318n. As mentioned above, the Web sites may be commerce sites in which visitors are engaged in some sort of on-line commerce, but the present invention is not restricted to use in connection with such sites. Hence, the Web pages may be associated with social networking sites, forums, blogs, content sites, etc. An e-commerce Web site may be setup by merchant administrator 312 or a business owner or any other person interested in selling products and services on-line. Examples of e-commerce Web sites include those operated by Amazon.com™, E-bay.com™ and others. However, it will be appreciated that present invention can be used with and is particularly beneficial for e-commerce Web sites operated by small businesses or individuals selling products or services on-line. The e-commerce server 302 may include Web page applications, Web pages, and e-commerce software for facilitating transactions with consumers on-line, however, in some cases aspects of these services will be hosted on other servers. For example, payment services may be facilitated through servers operated by payment fulfillment providers. Such details are not critical to the present invention. In general it is sufficient for purposes of the present discussion to assume that the e-commerce server includes a Web server (or Web applications) for hosting the e-commerce Web site's product Web pages. Usually, the e-commerce server 302 will also include or be associated with a merchant database 308 for storing customer and product information.

Also part of system 300 is an analytics system 208, hosting an analytics site, which may be made up of a plurality of analytics pages 320n. The analytics pages 320n, some or all of which may comprise merchant user interfaces, are the means by which analytics information concerning visits to Web sites (e.g., e-commerce Web site 406, shown in FIG. 4) is conveyed to merchant administrators. Such information may be stored by analytics system 208 in an analytics database 304 that is communicatively coupled to the analytics engine 218. In some cases, the analytics pages may be presented to a merchant administrator 312 via a Web browser running on a client computer system as individual pages.

The e-commerce Web sites 406 are accessed by users via client systems 314a-314c. The client systems may, in some cases, be computer systems, such as personal computers or the like, but more generally may be any computer-based or processor-based device that executes application software or embedded routines which allows the content of the Web site to be rendered for display to the user on a display device. For example, client systems may include computer systems and/or mobile devices such as iPads™, iPhones™, or others based on Apple Inc.'s iOS™, or Google Inc.'s Andriod™ operating system, or other tablets, smartphones, mobile phones, etc., and the application software may be a Web browser 316 such as Microsoft Corporation's Internet Explorer™, Apple Inc.'s Safari™, or Google Inc.'s Chrome™, etc. Such applications are typically stored in one or more computer readable storage devices accessible to one or more processors of the subject client system and, when executed, cause the processor(s) to perform the operations necessary to render the subject sites/pages for display at the subject system (e.g., via a display device communicatively coupled to the processor). Merchant mobile device 330 may likewise be a mobile device, such as an iPads™, smartphone, mobile phone, etc., and may execute dedicated application software and/or a Web browser to view analytics information provided through analytics system 208. The merchant mobile device 330 may also receive merchant notifications from the analytics system and communicate directly with customers at client devices 314a-314c via text messages, SMS messages, chat applications, instant message applications or even voice calls.

The various constituents of system 300, including analytics system 208 and e-commerce server 302 are communicatively coupled to one another via one or more computer/data/mobile phone networks 310, which may include the Internet and other networks coupled thereto and/or facilitating communications thereover. The various transceivers, computers, servers, routers, gateways, fiber optic cables, firewalls, wireless communication devices, radio towers and other networking devices which make up of network 310 and their precise hardware and software configurations is generally not critical to the present invention.

The analytics system 208 includes software and hardware for receiving communications from e-commerce server 302 and storing information in analytics system 208 and/or analytics database 304. The analytics system also communicates with merchant administrator 312 over network 310. The merchant administrator 312 may be a person using a desktop, laptop, server, mobile device or any other computing system that has sufficient computing resources to process and respond to information and instructions from analytics system 208. In other embodiments, the merchant administrator 312 may be an unmanned computer.

The analytics system 208 may store information on customers or visitors to the e-commerce Web site, such as products previously purchased, previous visits to the Web site, pages accessed and viewed, and any other useful information on the customer such as product preferences, gender, age, geography, etc. This information may be stored in analytics database 304 and/or any other database including merchant database 308 for later data mining, triggering rules to identify interesting customers, and customization of deals and promotions to customers. The analytics system communicates real time information concerning these customers and visitors and their activities at the e-commerce Web site, running on e-commerce server 302 to the merchant administrator 312. In some embodiments, this telemetry is facilitated via a cookie placed on the customer's/visitor's computer device. In other embodiments, user activities can be tracked via client-side code (e.g., Javascript) that interacts with the analytics system by sending specific events and related data, e.g., current product page, etc. In yet other embodiments, such data may be captured via a third-party analytics system, such as Google Analytics, that allows data exported to the analytics system.

Figure 7:
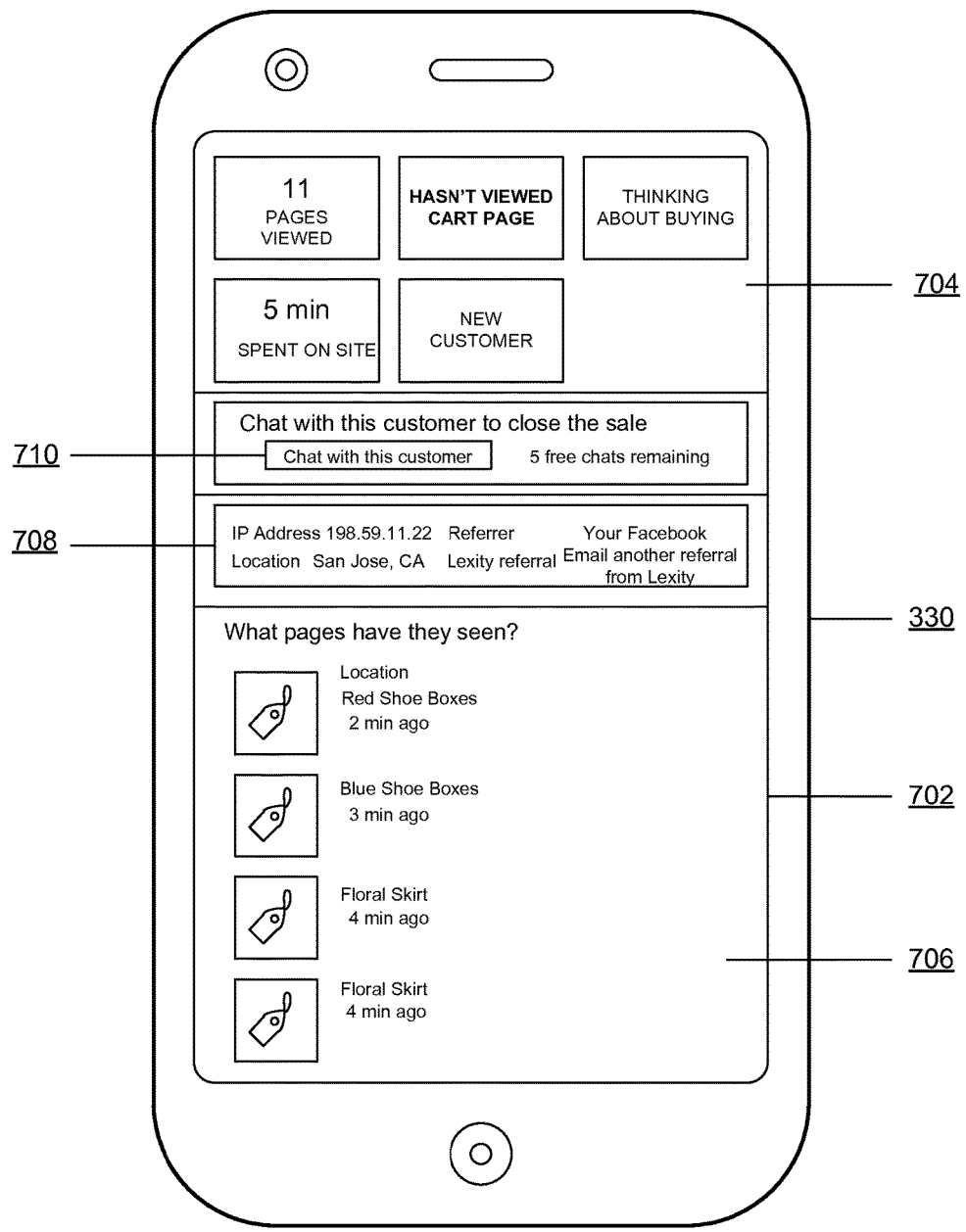
FIG. 7 illustrates a graphical user interface of a device according to one embodiments of the invention.

With further reference to FIG. 7, the analytics system 208 is also configured to provide automatic notification to a merchant, via merchant mobile device 330, either directly or via e-commerce server 302, upon recognizing predefined triggering customer behaviors. Such behaviors, which may be identified by comparing the observed behaviors to rules defining notification conditions, may include a visit by the customer to a certain number and/or type of pages at the e-commerce Web site 406, to specified pages at the Web site (e.g., pages associated with high margin products), the length of time the customer has been browsing the site, additions to and/or removals of products from an electronic shopping cart, additions of products to a shopping cart but no subsequent purchase within a specified time frame, indications by the customer that he/she intends to cancel a service or unsubscribe from a merchant's newsletter or other service, location of the user, gender, age of the user, previous visits, previous purchases of products and services, etc. Such indications may be presented to the merchant via a user interface 702 of an application running on the merchant's mobile device 330. For example, area 704 provides information concerning the number of pages visited by the user, the time spent on the site, whether the user is a first time or return customer, whether the user has viewed a shopping cart and/or has demonstrated behaviors that indicate he/she is thinking about buying, etc. Detailed information about the pages the customer has visited may be provided in area 706 of the user interface.

Further, in some cases the notifications may include information regarding the nature and location of a platform being used by the customer to browse the Web site. For example, the notification may advise the merchant as to whether the customer is browsing using a browser or application associated with a smartphone 314b. Alternatively, or in addition, as shown in area 708 of the user interface, the notification may include location information concerning the customer (e.g., derived from the IP address of the customer's computer system), the source of the customer's referral to the merchant's site, etc. In either or both instances, the notification may include means for the merchant to initiate a conversation with the customer, for example, a button 708 or other means to initiate an SMS communication session, or to send a message inviting the customer to call the merchant at a specified telephone number. In some cases, the merchant may receive notification and be provided a link to initiate the conversation with the customer in an SMS or other communication, without having to open a specialized application on the merchant's mobile device.

Figure 8:
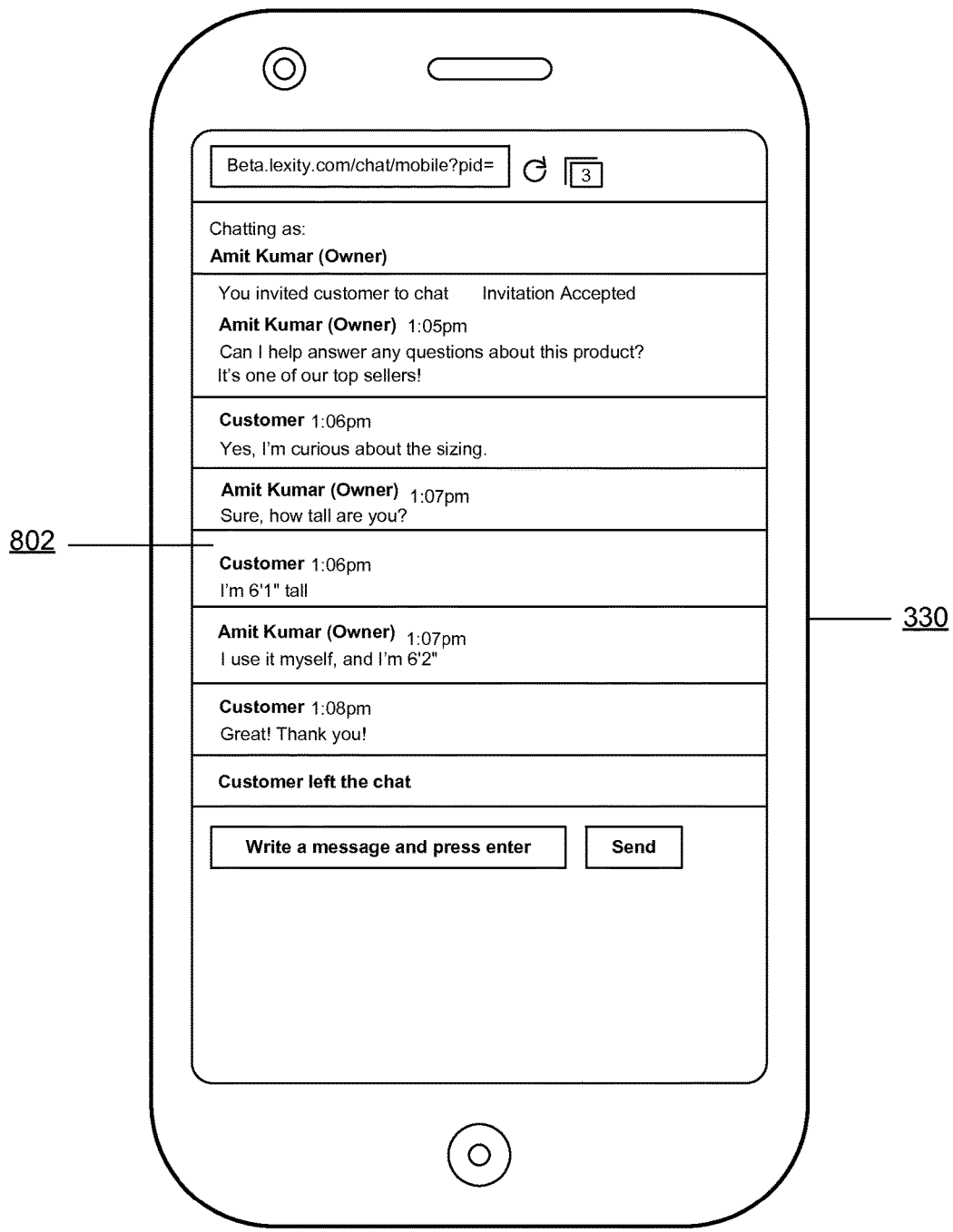
FIG. 8 illustrates a graphical user interface of a device according to one embodiments of the invention.

Upon receiving a notification from the analytics system, the merchant may initiate contact with the customer by sending an SMS or other message. This is facilitated by the analytics system including within the notification a hyperlink of other means that includes sufficient information for the merchant to initiate a communication channel between the merchant and the customer (e.g., who may be at a remote computer or smartphone). The customer may interact with the merchant through this channel using one or more interfaces, such as chat-boxes or SMS applications on a smartphone or other mobile computing device. In one embodiment, the merchant can pre-configure a phone number that he/she can send as part of communications with the visitor, so a phone call can be initiated if the visitor is on a mobile device. FIG. 8 illustrates an example of a chat session between a merchant and a customer, which may be presented via an interface 802 on the merchant's mobile device 330. The interface may be associated with a specialized application running on the merchant's mobile device or it may be the interface provided with a preconfigured text messaging application that runs on is incorporated in the operating system of the mobile device.

As shown in FIG. 3, e-commerce server 302 may include analytics software 322 which may be installed by a merchant administrator 312 or analytics system 208, or any other person, entity or computer system implementing the present invention. In one embodiment, the analytics software installed on e-commerce server allows the e-commerce server to communicate directly with and transmit information to and from analytics system 208, and also receive information from customer computers interfacing with the e-commerce system, thus allowing the triggering customer behaviors to be observed.

FIG. 3 also depicts clients 314a-c which are typically used by consumers visiting e-commerce Web sites, such as e-commerce server 302. Clients 314a-c may consist of computing devices, such as a computer 314a (laptop or desktop), a smartphone 314b, or a tablet or other portable computing device 314c (such as the Apple i-Pad™). Clients 314a-c are employed by various consumers who visit e-commerce Web sites hosted by e-commerce server 302. As shown in this embodiment, the clients 314 include Web browser 316n (or other software) for visiting e-commerce Web sites. The Web browsers used in embodiments of the invention may include, for example, Microsoft Explorer®, Firefox®, Netscape Navigator®, Apple Safari® and Google Chrome™. The Web browsers may be configured to allow the receipt of cookies and/or other files for monitoring the activities of Web browsers 316 and/or clients 314a-c on e-commerce Web sites. As shown and depicted in FIG. 3, the e-commerce server transmits Web pages 318n (such as product Web pages) to the Web browsers 316n.

In one embodiment, consumers or customers desiring to visit an e-commerce Web site use clients 314 and Web browsers 316n to visit or log into e-commerce server 302 with e-commerce Web site. In on embodiment, upon logging in, the e-commerce server 302 and/or analytics system 208 determine whether the customer has previously logged in or registered with the Web site. If the customer is visiting the e-commerce server 302 for the first time, the analytics software 322 and/or other software or application on the e-commerce Web site is notified of the new customer (which may be identified by its client Internet Protocol (IP) address, computer media access control (MAC) address, registration information, or other information) that identifies the client 314 as a new customer or visitor of the e-commerce Web site. The customer information will be stored at the analytics system 208 and/or e-commerce server or merchant database 308. It will also be appreciated that each time a new customer or previous customer visits the e-commerce server, or upon fulfillment of the triggering behaviors, the analytics system 208 receives notification of the customer activity and may so inform the merchant via a notification to merchant mobile device 330. In another embodiment of the invention, the analytics system 208 will receive information on the login of clients 314a-314c. For example, cookies, or other software may be installed or present on customer client devices that communicate directly with the analytics system to provide the system real-time access to information on the customers visiting the e-commerce Web site 408 In one embodiment, user specific information such as gender, age, geographical information, etc. can be passed to the analytics system.

According to one embodiment of the invention, if a new or previous customer is identified, e-commerce server, using analytics software 322, may transmit a cookie or (other monitoring file) to the client Web browser 316. The cookie or monitoring file is used to transmit information from client devices and/or Web browsers 316*n* to analytics system 208. The information transmitted includes the activities of the customer and the interactions of the customer with the e-commerce Web site. For example, each time the consumer visits the c-commerce Web site, views a product page, puts an item in a shopping cart, removes an item, flips back and forth across products, purchases an item, or takes any other action on the e-commerce Web site, such information is transmitted to the analytics system 208.

The consumer actions taken on e-commerce Web site are sometimes referred to herein as "real-time consumer activity". The real-time consumer activity from clients 314*a-c* or Web browsers 316*n* may be transmitted directly to the analytics system 208, for processing and notification to the merchant mobile device 330 over the network 310, or alternatively transmitted to the e-commerce server and then routed to analytics system 208 by analytics software 322 or other applications on the e-commerce server that are in communication with analytics system 208, for eventual processing and display to the merchant administrator 312 and/or notification to merchant mobile device 330. According to one embodiment, each time a new visitor or customer enters a merchant's e-commerce Web site, the analytics system is alerted through a notification. The notification may be electronic signal, message, data package or other form of computerized communication known to one of ordinary skill in the art. In this way, the analytics system can begin monitoring the customer's activities on the Web site for real-time reporting to the merchant administrator and/or notification to the merchant mobile device.

It will be appreciated that clients 314*a*-314*c* may have Web browsers 316*n* which may periodically or upon command delete cookies or other files received from the Internet. Accordingly, embodiments of the present invention allow the e-commerce server to transmit the cookie or monitoring file to the client 314 each time a consumer logs into or visits the e-commerce server. This will ensure that the analytics system can receive information on the activities of consumers visiting the e-commerce Web site. In other embodiments, the e-commerce Web site may enable the use of cookies on the consumer's client device, depending on whether the use of cookies or other Internet files that transmit information over a network is enabled on the device. The commerce server and/or analytics software on the e-commerce server may also prompt the consumer to turn on cookies when the user visits the Web site to ensure that the user can experience an optimal real-time on-line shopping experience and qualify for promotions and deals.

In other embodiments, it may not be necessary to employ a cookie or monitoring file for transmitting information to the e-commerce server 322 and/or analytics server 208. It is also possible that the consumer visiting an e-commerce server can register with the Web site and obtain a user name/password for subsequent recognition by the e-commerce server upon login. In this situation, the analytics system can track the user's real time consumer activity through the login session with or without cookies being transmitted to the user's computer.

According to one embodiment, the merchant mobile device 330 is owned/operated by the merchant who owns or operates the e-commerce Web site hosted on e-commerce server 302. The merchant may receive notifications from the analytics system 208 using any suitable computing device with a network connection, such as desktop, laptop or mobile computing device connected to the Internet and/or to a mobile device network (such as a cellular telecommunications network). In one embodiment, the communications between the merchant mobile device 330 and the analytics system 208 are bi-directional. The merchant may log into the analytics system 208 using a unique user name and password provided by the analytics system. In one embodiment, the merchant uses a Web browser to access the analytics system 208. In other embodiments, the merchant may use an application residing on the merchant's mobile device 330 that communicates with the analytics system. The merchant is able receive notifications of triggering activities of customers to the merchant's e-commerce Web site through the analytics system 208, which as discussed above, receives real-time information on clients 314*a-c* that are visiting and interacting with e-commerce server 208. This frees the merchant from continually having to monitor the analytics information at an administration console or other venue.

According to one embodiment, the analytics system 208 includes a merchant notification application 220 (shown in FIG. 4), which provides the merchant administrator with notification concerning the real-time activities of individuals (clients 314*a-c*) visiting the site. Preferably, the notifications are provided when specified triggering behaviors are observed. As shown in FIG. 3, the analytics system 208 may provide analytics pages 320*n* to the merchant, which analytics pages 320*n* may include information such as the number/identity of customers currently visiting the e-commerce Web site, the identity of the customer currently "browsing" for products, the identity of the products which the customer is browsing, the number/identity of products placed into a virtual shopping cart, the number/identity of previously purchased products or services, and an identification of any negative behaviors of the customer (such as attempts to cancel services, removal of products from a shopping cart, etc.). In addition to receiving information from the analytics system for viewing real-time consumer activity, the merchant also receives a link or other means to initiate communications with the customer (either directly or through the e-commerce Web site) for example by sending the customer a message inviting direct communications via SMS messaging, other messaging or a telephone call to a number specified by the merchant.

Figure 4:
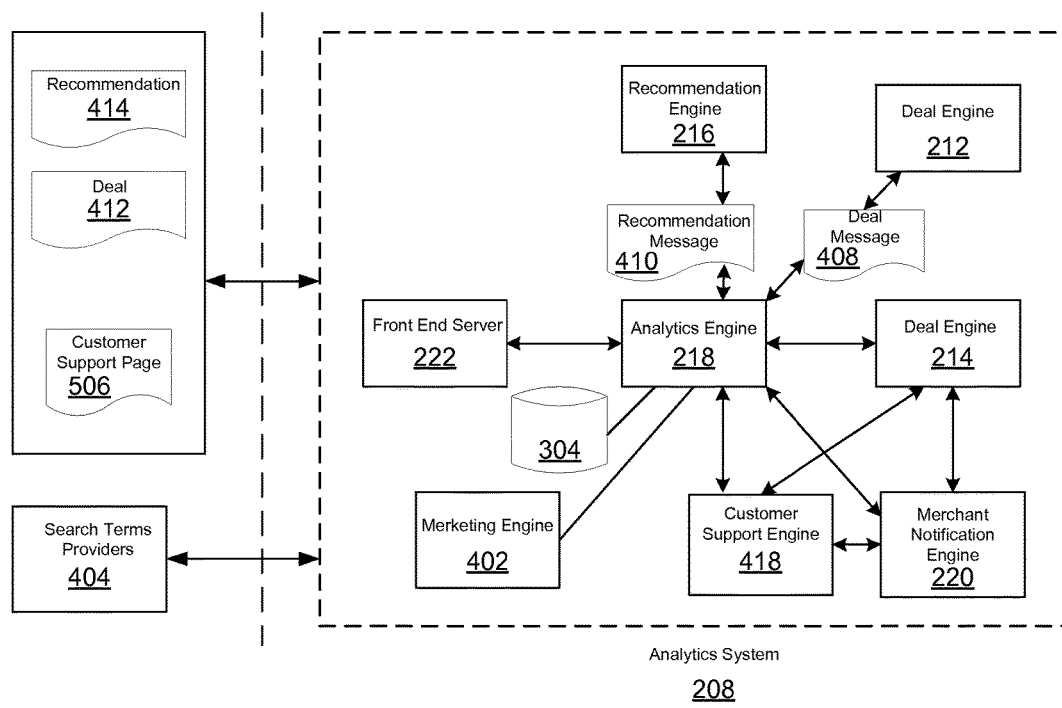
FIG. 4 illustrates a block diagram of a system according to one embodiment of the invention.

FIG. 4 shows an embodiment of the analytics system 208. The analytics system includes various software modules and databases for processing real-time consumer activity, including deal engine 212, rule engine 214, recommendation engine 216, analytics engine 218, analytics database 304, merchant notification engine 220, front end server 222, marketing engine 402, and customer support engine 418. In one embodiment, the analytics system 208 communicates with e-commerce Web site 406, to provide real time information on customers visiting e-commerce Web site. According to one embodiment, the e-commerce Web site communicates with front end server 222. The front end server 222 may be a Web server or communications server for processing commands, instructions and data to and from analytics engine 218 or any other component of the analytics system 208. According to one embodiment of the invention, the front end server 222 may be responsible for all incoming and outgoing communications with e-commerce Web site 406.

According to one embodiment, at the core of the analytics system 208 is the analytics engine 218. In one embodiment, the analytics engine receives data and information from the e-commerce Web site 406 and/or clients 314*a-c*, concerning the real time consumer activities occurring on an e-commerce Web site. Real-time analytics information, including customer information is stored in analytics database 304. For example, when a customer visits e-commerce Web site 406, the analytics engine will receive a notification or alert of the customer from the e-commerce Web site. The analytics engine can use the information to determine whether the customer is a first time customer or a new customer and update the analytics database accordingly. The analytics engine can also check with the deal engine 212 or the recommendation engine 216, to determine whether there are any deals or recommendations that should be provided to the customer on the e-commerce Web site for display on Web browsers 316n. The analytics engine can also check with the rules engine 214 to determine if the observed customer behaviors at the e-commerce Web site are such that a merchant notification should be provided via the merchant notification engine 220.

In one embodiment of the present invention, the analytics engine 218 is also a data mining center that is capable of receiving information from other Web sites, databases and information centers in order to monitor general consumer trends or activity on the Internet. This information may be communicated to the merchant mobile device via merchant notification engine 220. The merchant then has the option of changing the offerings on e-commerce Web site 406 in real-time in order to react to market and consumer trends.

According to one embodiment, the rule engine 214 includes instructions and data to define certain rules for triggering merchant notifications in response to activities at e-commerce Web site 406. For example, the rule engine may include instructions to notify the merchant if the customer places a certain number or kind of products from e-commerce Web site in a shopping cart or visits the Web site or specified pages thereof a certain number of times. The rule engine may be dynamic in that it may adapt to trends or events. For example, a rule may be set to notify a merchant in the event of certain external events (e.g., the outcome of a sporting match). In this case, the rule engine would receive real-time feedback from the analytics engine 218, which is configured to receive information and mine data on events of interest such as sporting events, elections, concerts, news, and customer trends and consumer habits. In such instances, notification to the merchant may allow the merchant to change conditions at the e-commerce Web site in real time to accommodate these external conditions.

A customer visit or behavior can trigger a pre-programmed rule that determines the kind of merchant notification to be provided. For example, the rule engine allows the analytics system to determine whether a customer should receive an invitation to call the merchant or just receive a special promotion. For example, there may be rules for repeat customers that specify customer preferences (e.g., calls vs. text messages, vs. promotion message only). In one embodiment, the rule engine maintains a hierarchy of support levels that determines the member of a management team to receive a notification based on customer status or purchasing activity. For example, a customer who purchases over $1000 in merchandise may trigger a notification to a manager or above, while a visit by a customer that makes less valuable purchases may trigger a notification to an assistant manager or below. The notifications can be sent by SMS, email or instant message, or even phone call, alerting the member of the management team to the visit and allowing him or her to initiate contact with the customer.

In one embodiment of the invention, the customer support engine 418 is responsible for generating real-time customer support pages such as customer support page 508 depicted in FIG. 4. The customer support engine 418 is communicatively coupled to the analytics engine 218 and the rule engine 214, and is capable of generating customer service graphics and visual icons for the consumer, that may be rule based or specified manually by the merchant, through the merchant notification engine. The customer support engine 418 may also process customer inquiries and real time requests from the customer and forward the requests to the merchant via the merchant notification engine 220. Alternatively, the customer support engine can forward the requests and inquiries to the analytics engine to check with the rule engine to determine whether an automated response available for the customer that would not require a live merchant.

In one embodiment, the merchant notification engine 220 is communicatively coupled to the customer support engine 418, allowing for real time merchant-to-customer interactions. The merchant notification engine 220 receives consumer inquiries and requests via the customer support engine 418, and displays the requests to a merchant in text or graphical form on a merchant mobile device. The merchant can then initiate a communications session over the network and "chat" with the customer through dialog boxes or display messages to the customer providing feedback, recommendations and responses to the customer direct inquiries or web browsing habits. In one embodiment, the merchant may send the desired product or service web page automatically to the customer and present the customer with the purchase screen for the product that the customer desires, obviating the need for the customer to browse through web pages or search for the desired web page. Real-time interactions manipulating the web browser to display customized pages or specific product web pages can be controlled by a live merchant using, for example, cookies placed on the customer's computer or through specific and authorized communications sessions using software such as Netmeeting™ (or any other comparable software known by one of ordinary skill in the art).

In another embodiment, the merchant can guide the visitor to the top selling or most popular products within a given product category, so that the visitor can quickly find and purchase the right product.

According to one embodiment of the present invention, the deal engine 212 generates specific deals and promotions based on the rules or information received from rule engine 214 or analytics engine 218. The deal engine may generate a deal message 412, which may be any command or data instruction to be sent to the e-commerce Web site 406, and subsequently displayed to visitors of e-commerce Web site, such as clients 314a-c. The deal message 412 may be customized for a particular customer based on feedback from the analytics engine 218 and/or rule engine 214 such that a command may specify that certain deals and promotions be made available to repeat customers, new customers, or randomly selected customers. In another embodiment, the merchant can select from a list of recommendations or offers in order to send the right offer to the visitor during the conversation.

It will also be appreciated that the merchant can customize deals as the merchant views the customer real-time consumer activity. This can be accomplished, for example, by specifying or changing the rules, or sending a command from a merchant mobile device through the merchant notification engine 220, which command will be relayed through the analytics system to the e-commerce Web site 406. It should be noted however, that a deal can be generated in number of different ways, both manual and automatic, according to present embodiments of the invention. The generation of deals in real-time is particularly advantageous to the merchant. For example, when the merchant is notified of certain customer activities at the e-commerce Web site, the merchant may instruct the deal engine to 212 to send a deal message 412 to those customers who have exhibited certain behaviors or performed certain actions.

In one embodiment, the recommendation engine 216 is also a part of the analytics system 208. The recommendation engine can generate recommendations, such as recommendation message 414, which includes a recommended product, service or related product that is based on the user's decision to purchase or tentatively purchase (by placing item in virtual shopping cart) a product or service from the e-commerce Web site 406. The analytics engine 218 can receive feedback on the user's purchases or tentative purchase decisions and transmit this information to the recommendation engine 216 and/or the deal engine 212, to determine whether there is recommendation and/or deal available for the customer. For example, a customer purchasing a laptop may also be interested in laptop cases and/or hardware and software upgrades to the base model. In this case, the recommendation engine can make additional product recommendations or upgrades, which will be generated and sent to the user of the e-commerce Web site.

Marketing engine 402 may also be implemented in certain embodiments of the invention. The marketing engine is useful for marketing the merchant's e-commerce Web site or other merchant promotions on the Internet. In one embodiment, as shown in FIG. 4, the marketing engine may bid on certain search terms with search term providers 404, such as Google™, Yahoo™, Facebook™ or Microsoft Bing™. The marketing engine may be configured to bid on terms based on rules specified by the rule engine 214 and data provided by the analytics engine 218.

Another way in which the marketing engine can be used is based on real-time feedback to the merchant of activity on the merchant's e-commerce Web site 406. For example, increased traffic on pages for certain products or placement of those products in virtual shopping carts, can prompt a notification to the merchant's mobile device to take action, for example, updating inventory. The ability to react to user trends and news in real time provides the merchant with an advantage over conventional e-commerce system.

According to one embodiment, the merchant notification engine 220 is incorporated into analytics system 208 as shown in FIG. 4. The merchant notification engine presents notifications to merchants via mobile devices based on real-time analytics information. The merchant notification engine 220 receives real-time analytics information from the analytics engine 218 and creates notifications for the merchant based thereon. The merchant notification engine can generate, among other things, a notification whenever certain predetermined customer behaviors are detected in customers visiting e-commerce Web site 406. The merchant notification engine is also configured to receive communications and commands from a merchant via the merchant's mobile device. For example, a merchant may specify or change rules, create deals and promotions, or provide instructions to the marketing engine 402 via such commands. In one embodiment, the merchant notification engine provides a merchant the ability to engage in live communications with a customer to the e-commerce Web site, for example by providing the merchant a link to initiate a chat, SMS or other communication session. The notification engine may include functionality for generating notifications whenever specified consumers login to the e-commerce Web site or whenever rules that define activities for which notifications should be sent are triggered.

Figure 5:
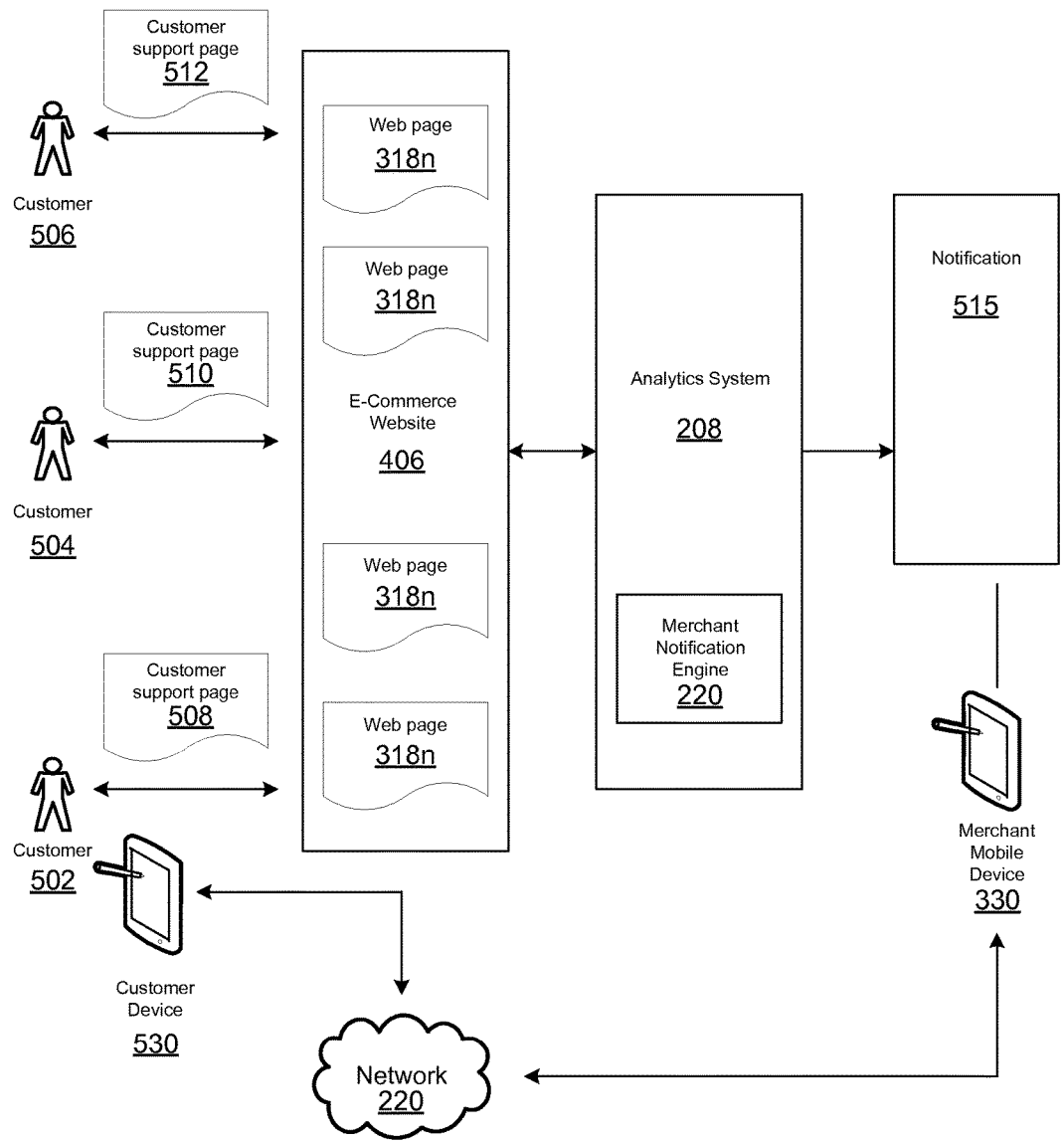
FIG. 5 illustrates a block diagram of a system according to one embodiment of the invention.

FIG. 5 depicts a system for real-time notifications to a merchant in an e-commerce environment. Shown in FIG. 5 are exemplary customers 502-506. Customers 502-506 may be browsing web pages on e-commerce Web site 408, which is communicatively coupled to the analytics system 208. The analytics system analyzes user behaviors and generates merchant notifications 515 to merchant mobile device 330 whenever rules for such notifications are triggered by the customer behaviors at the e-commerce website 406. For example, if one or more of customers 502-506 browse certain product web pages that have been established as triggering pages, then the analytics system 208 will instruct merchant notification engine 220 to send a notification 515 to the merchant mobile device 330. The merchant may receive the notification at a mobile device, such as an iPhone™, via an SMS message, email or other communication channel. In some embodiments, the notification includes a link for the merchant to initiate an SMS communication session with the customer and by selecting the link an SMS message may be transmitted via network 520 to customer device 530. Alternatively, the message to customer device 530 may be transmitted via the analytics system 208 and website 406. Where the message to the customer's device 530 includes the phone number of the merchant, the customer may call the merchant directly to discuss a possible purchase.

The notification 515 provided to the merchant mobile device may include current status information regarding the customer's activity at the website, as well as customer profile information retrieved from a customer database. This may include past purchase behaviors and information, customer preference information, and so on. By providing real-time information and analytics on current visitors to the merchant's e-commerce Web site, the merchant may be better informed about the customer prior to directly interacting with customers 502-506 and may also instruct the analytics system to render customer support pages 508-512 which are customized for consumers 502-506, respectively. For example, a visit by repeat customer can trigger a notification to the merchant, who may in turn command the analytics engine 218 to provide a customer support page that includes a customized greeting, and at the same time the merchant may initiate a chat session to provide personal shopping assistance.

In one embodiment, the analytics system may upload information on customers 502-506 from sources such as the user's email account, Facebook™ page, LinkedIn™ account, Google+™ or any other social or professional networking site which allows for communication of customer information with the analytics system. Based on the information provided by these third party sources, the analytics system may create specialized or customized rules for the customer that enable the merchant to efficiently recognize the preferences and purchasing habits of certain customers. For example, the merchant may be alerted that a customer is a "sports fan" and in particular, a "Giants baseball fan." With this information, the merchant can customize certain deals and promotions or provide specific customer support to the consumer who appears to be browsing for sporting merchandise.

In another embodiment, the communications from the analytics system can be directed to an email address that is monitored by multiple agents, allowing timely monitoring and responses to visitors.

Figure 6:
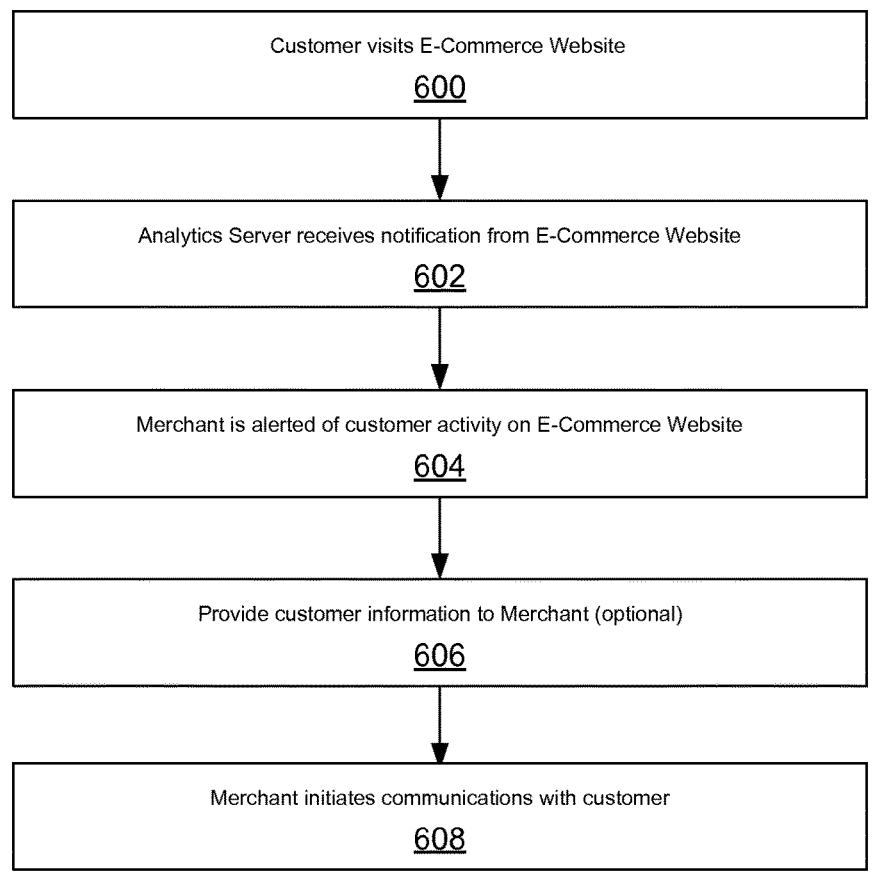
FIG. 6 illustrates a flow diagram of a method according to one embodiment of the invention.

FIG. 6 is a flow diagram showing a method according to one embodiment of the invention. In step 600, the customer visits the e-commerce Web site. In step 602, the analytics server receives a notification from the e-commerce Web site regarding the customer's presence and/or activities on the e-commerce Web site. In step 604, the merchant is alerted via a notification to a mobile device of customer activity on the e-commerce Web site. In optional step 606, the analytics system provides customer information to the merchant. In step 608, the merchant initiates a communication session with the customer, for example via SMS or other communication channel. As part of the session, the merchant may provide the customer a phone number at which the merchant can be reached for a live telephone call. It should be noted that the analytics engine can make a determination of whether the visitor is a first time visitor of the e-commerce Web site, a previous visitor or a previous customer. This information may be used by the merchant, for example to customize the message to the customer.

According to the real-time aspect of this embodiment of the invention, the analytics engine requests pings from the customer web browser based on the activity of the customer. For example, if the customer has moved to a different product web page or is simply idle on a single web page, this information may be provided to the analytics engine and then to the merchant notification engine so the merchant can be informed of the customer's activity in real-time. The merchant notification engine may be configured to update the merchant based on the real activity registered by notifications received from the customer computer. The rule engine may be invoked each time new behaviors are identified to determine if additional or alternative merchant notifications need to be sent, e.g., if the merchant is not paying attention or is away from his mobile device and has not initiated contact with the customer. In such cases, notifications may be sent to others.

In addition to the embodiments discussed above, the present invention finds application in other situations. For example, the present invention may be used to notify service providers (e.g., plumbers, electricians or other trades people, real estate agents, etc.) when individuals in their local areas are browsing their Web sites. Geographic locations of potential customers can be derived from IP addresses of the customer's computer and the service provider notified when a local customer is at the web site. This may serve as a trigger for the service provider to initial a chat or telephone session with the potential customer. For example, the service provider can initiate a chat session, providing the potential customer with the service provider's phone number and inviting the potential customer to call. This functionality is especially useful for service providers seeking to convert sales on these kinds of Web site visits, which usually indicate an immediate need for service on the part of the potential customer.

As should be apparent from the foregoing discussion, various embodiments of the present invention may be implemented with the aid of computer-implemented processes or methods (i.e., computer programs or routines) or on any programmable or dedicated hardware implementing digital logic. Such processes may be rendered in any computer language including, without limitation, an object oriented programming language, assembly language, markup languages, and the like, as well as object-oriented environments such as the Common Object Request Broker Architecture (CORBA), Java™ and the like, or on any programmable logic hardware like CPLD, FPGA and the like.

It should also be appreciated that the portions of this detailed description that are presented in terms of computer-implemented processes and symbolic representations of operations on data within a computer memory are in fact the preferred means used by those skilled in the computer science arts to most effectively convey the substance of their work to others skilled in the art. In all instances, the processes performed by the computer system are those requiring physical manipulations of physical quantities. The computer-implemented processes are usually, though not necessarily, embodied the form of electrical or magnetic information (e.g., bits) that is stored (e.g., on computer-readable storage media), transferred (e.g., via wired or wireless communication links), combined, compared and otherwise manipulated. It has proven convenient at times, principally for reasons of common usage, to refer to these signals as bits, values, elements, symbols, keys, numbers or the like. It should be borne in mind, however, that all of these and similar terms are to be associated with the appropriate physical quantities and are merely convenient labels applied to these quantities.

Unless specifically stated otherwise, it should be appreciated that the use of terms such as processing, computing, calculating, determining, displaying or the like, refer to the action and processes of a computer system, or similar electronic computing device, that manipulates and transforms data represented as physical (electronic) quantities within the computer system's registers, memories and other storage media into other data similarly represented as physical quantities within the computer system memories, registers or other storage media. Embodiments of the present invention can be implemented with apparatus to perform the operations described herein. Such apparatus may be specially constructed for the required purposes, or may be appropriately programmed, or selectively activated or reconfigured by a computer-readable instructions stored in or on computer-readable storage media (such as, but not limited to, any type of disk including floppy disks, optical disks, hard disks, CD-ROMs, and magnetic-optical disks, or read-only memories (ROMs), random access memories (RAMs), erasable ROMs (EPROMs), electrically erasable ROMs (EEPROMs), magnetic or optical cards, or any type of media suitable for storing computer-readable instructions) to perform the operations. Of course, the processes presented herein are not restricted to implementation through computer-readable instructions and can be implemented in appropriate circuitry, such as that instantiated in an application specific integrated circuit (ASIC), a programmed field programmable gate array (FPGA), or the like.

It should be appreciated that the embodiments described above are cited by way of example, and that the present invention is not limited to what has been particularly shown and described hereinabove. Rather, the present invention includes both combinations and subcombinations of the various features described hereinabove, as well as variations and modifications thereof which would occur to persons skilled in the art upon reading the foregoing description and which are not disclosed in the prior art.

The invention claimed is:

1. An analytics system comprising one or more server computers capable of being coupled, via a network, to computers or computing devices of potential customers, and to a computer or a computing device of a merchant administrator of a merchant, the system comprising one or more processors and a non-transitory storage medium comprising program logic for execution by the one or more processors, the program logic comprising:

an analytics engine that receives and stores real-time information about activity of potential customers on an e-commerce Web site, the receiving and storing real-time information about activity of potential customers on the e-commerce Web site comprising transmitting, by the analytics engine via the network to a computing device of a potential customer, a request for a ping from a browser running on the computing device of the potential customer, the ping comprising at least one of idle data and new web page data;

a rule engine including one or more rules for making a determination, based at least in part on the real-time information, of when to provide a real-time notification to the merchant administrator regarding contacting, in real-time, the potential customer on the e-commerce Web site regarding a potential purchase by the potential customer; and a merchant notification engine that:
  based on the determination, provides the notification to the merchant administrator; and
  facilitates initiation of a real-time electronic communication between the merchant administrator and the potential customer regarding the potential purchase.

2. The system of claim 1, wherein the computer or the computing device of the merchant administrator is a mobile device.

3. The system of claim 2, wherein the rule engine includes one or more rules for determining a format of the notification, and wherein the format is at least one of an instant message, a text message, a short message service, a multimedia message service, or a phone call.

4. The system of claim 2, wherein the real-time electronic communication includes at least one of images, audio, video or multimedia messages.

5. The system of claim 2, wherein, utilizing the rule engine, the determination is triggered based on a combination of factors comprising factors relating to past and current activity of the potential customer on the e-commerce Web site.

6. The system of claim 2, comprising a deal engine that, based at least in part on information from the analytics engine and information from the rule engine, determines a deal or a coupon for the merchant administrator to present to the potential customer through the real-time electronic communication, wherein the deal or the coupon is customized to the potential customer and relates to a product for potential purchase by the potential customer, and wherein the notification provides the merchant administrator with an option to send the deal or the coupon to the potential customer as part of the real-time electronic communication.

7. The system of claim 2, comprising a recommendation engine that, based at least in part on information from the analytics engine and information from the rule engine, determines one or more recommendations for the merchant administrator to present to the potential customer through the real-time electronic communication, wherein the one or more recommendations are customized to the potential customer and relate to a product for potential purchase by the potential customer, and wherein the notification provides the merchant administrator with an option to send a recommendation, of the one or more recommendations, to the potential customer as part of the real-time electronic communication.

8. The system of claim 2, wherein the notification includes a link which, if activated by the merchant administrator, causes a message, created by the analytics system, to be sent to the computer or the computing device of the potential customer, wherein the message invites the potential customer to engage in a direct, real-time communication with the merchant administrator.

9. The system of claim 8, wherein the message invites the potential customer to engage in a direct real-time communication with the merchant administrator by at least one of SMS or a chat session.

10. The system of claim 8, wherein the message includes a phone number of the merchant administrator and invites the potential customer to call the merchant administrator directly using the phone number.

11. The system of claim 8, wherein the message includes a phone number of the merchant administrator and invites the potential customer to call the merchant administrator directly using the phone number using a click to call option.

12. The system of claim 2, wherein the notification is provided to the merchant administrator via a merchant administrator application running on the mobile device of the merchant administrator, and wherein the notification includes information regarding the type of device being used by the potential customer to access the e-commerce Web site, information about the potential customer obtained from at least one social networking site on which the potential customer has an account, and a geographic location of the potential customer.

13. The system of claim 2, wherein the notification is provided to the merchant administrator via a merchant administrator dashboard running on the mobile device of the merchant administrator, and wherein the dashboard provides the merchant administrator with real-time information regarding potential customers browsing the e-commerce Web site.

14. The system of claim 1, wherein the computer or the computing device of the potential customer is a mobile device.

15. The system of claim 1, wherein the computer or the computing device of the merchant administrator is a mobile device comprising a cell phone, a smart phone, an iPhone, a tablet, or a notebook computer.

16. The system of claim 15, wherein at least one factor in determining a format of the notification is a type of mobile device being used by the merchant administrator.

17. A method, implemented on an analytics system comprising one or more server computers, each of the server computers comprising a processor and a memory, the method comprising:
  the analytics system receiving and storing real-time activity information about activities of potential customers on an e-commerce Web site, the receiving and storing real-time information about activity of potential customers on the e-commerce Web site comprising transmitting, by the analytics engine via the network to a computing device of a potential customer, a request for a ping from a browser running on the computing device of the potential customer, the ping comprising at least one of idle data and new web page data;
  the analytics system, based at least in part on a set of rules that utilize, as input, the real-time activity information, making a determination of when to provide a real-time alert message to a mobile computing device of a merchant administrator regarding contacting, in real-time, the potential customer on the e-commerce Web site regarding a potential purchase by the potential customer; and
  the analytics system, based at least in part on the determination, sending the alert message to the mobile computing device of the merchant administrator, wherein at least a portion of the alert message can be selected by the merchant administrator to cause initiation of a real-time electronic communication between the merchant administrator and the potential customer regarding the potential purchase.

18. The method of claim 17, wherein at least a portion of the alert message can be selected by the merchant administrator to cause initiation of the real-time electronic communication, including sending a deal message or a recommendation message to the potential customer from the merchant administrator and regarding the potential purchase, and wherein content of the deal message or content of the recommendation message is generated by the analytics system utilizing the real-time activity information, and wherein the deal message or the recommendation message is customized to the potential customer.

19. The method of claim 17, wherein the mobile device of the merchant administrator comprises a cell phone, a smart phone, an iPhone, a tablet, or a notebook computer.

20. A non-transitory computer readable storage medium or media tangibly storing computer program logic capable of being executed by a computer processor, the program logic comprising:

analytics engine logic for obtaining and storing real-time information about activity of potential customers on an e-commerce Web site, the obtaining and storing real-time information about activity of potential customers on the e-commerce Web site comprising transmitting, by the analytics engine via the network to a computing device of a potential customer, a request for a ping from a browser running on the computing device of the potential customer, the ping comprising at least one of idle data and new web page data;

rule engine logic including one or more rules for making a determination, based at least in part on the real-time information, of when to provide a real-time notification to a merchant administrator regarding contacting, in real-time, the potential customer on the e-commerce Web site regarding a potential purchase by the potential customer; and merchant notification engine logic for:
    based on the determination, sending the notification to the merchant administrator; and
    upon selection by the merchant administrator of at least a portion of the notification, initiating a real-time electronic communication between the merchant administrator and the potential customer regarding the potential purchase.

\* \* \* \* \*